MANUAL DIAPHRAGM SETTING DEVICE FOR A CAMERA HAVING AUTOMATIC EXPOSURE ADJUSTING DEVICE

Original Filed June 12, 1969

United States Patent Office

Re. 27,741
Reissued Aug. 28, 1973

27,741

MANUAL DIAPHRAGM SETTING DEVICE FOR A CAMERA HAVING AUTOMATIC EXPOSURE ADJUSTING DEVICE

Yozo Iida, Tokyo, Japan, assignor to
Nippon Kogaku, K.K., Tokyo Japan

Original No. 3,601,023, dated Aug. 24, 1971, Ser. No. 832,623, June 12, 1969. Application for reissue Aug. 18, 1972, Ser. No. 281,860
Claims priority, application Japan, June 26, 1968, 43/54,196
Int. Cl. C03b *7/12, 9/02*
U.S. Cl. 95—10 C 9 Claims

Matter enclosed in heavy brackets [ ] appears in the original patent but forms no part of this reissue specification; matter printed in italics indicates the additions made by reissue.

ABSTRACT OF THE DISCLOSURE

A manual control for the diaphragm of a camera is provided to override the automatic setting of the diaphragm by an exposure meter built into the camera. By a scissoring, or pinching action of two levers pivoted on a common shaft, a rocker actuating shaft controlling the automatic setting of the aperture blades is moved into and held in a desired aperture setting position upon depression of a pushbutton and rotation of an aperture setting sleeve. An operating rod movable upon depression of the pushbutton permits biased movement of one lever and also opens the exposure meter circuit. A cam groove in the aperture setting sleeve positions the other lever to the desired aperture setting positions.

This invention relates to a manual diaphragm setting device for a camera provided with automatic exposure adjusting device comprising photoelectric element, exposure meter, circuit resistors, etc.

In a camera having an automatic exposure adjusting device, manual correction of diaphragm is necessary when the automatic exposure adjustment is thought unsuitable for the picture-taking conditions. There have been many proposals to attain this purpose.

An object of this invention is to provide a manual control for the aperture setting mechanism of a camera which overrides the automatic aperture setting by an exposure measuring circuit build into the camera.

According to this invention, careless shifting from automatic operation to manual operation is avoided and, in switching from automatic operation to manual operation, it is possible to bring the stop position of the operating shaft, which are normally nonuniform, to a constant starting position upon performing the switching operation. And, as will be described later, since it is possible to determine properly the cam groove of the diaphragm knob depending on the angle of rotation of the diaphragm knob and that of the operating shaft, such operations as fade-in and fadeout can be made very easily.

In accordance with this invention, a rocker actuating shaft positioned by the built-in exposure meter for automatically setting the aperture opening of the camera, passes between two levers pivoted on a common shaft within the camera body, the two levers permitting unrestricted movement of the actuating shaft during "automatic" operation. For manual operation, a pushbutton is provided slidably received in a rotatable aperture setting sleeve, the sleeve being formed with an L-shaped groove and a spiral groove. An operating rod is secured to the pushbutton and passes through the L-shaped groove, the free end of the operating rod cooperating with a normally closed switch in the exposure meter circuit, and with the free end of one of the pivoted levers. The other lever is provided with a follower pin on its free end which engages the spiral groove in the aperture setting sleeve. When the pushbutton is depressed, the operating rod permits the one lever to be biased by a spring toward the operating shaft while at the same time opening the switch in the exposure meter circuit. The aperture setting sleeve may now be rotated to a desired aperture setting, the second lever being pivoted by the camming action of the spiral groove toward the operating shaft to a desired aperture setting position. The actuating shaft controlling the diaphragm blades is thus pinched or held between the two levers in a desired aperture setting position. The return of the aperture setting sleeve to its "automatic" position will permit the pushbutton to be returned by appropriate resilient means to its initial position to return the one lever to its "open" position, while the resetting of the aperture setting sleeve will cam the second lever to its "open" position.

This invention will be described more clearly referring to the illustrative embodiment shown in the attached drawings, in which.

Figure 1:
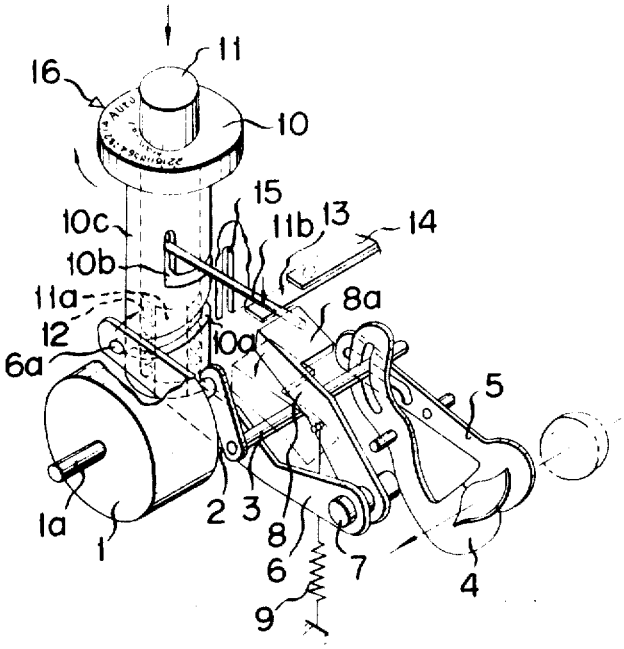
FIG. 1 is a perspective view of an embodiment of this invention.

Referring now in detail to FIG. 1, only those parts of an automatic aperture control of a camera are illustrated which are necessary for an understanding of the invention, together with the overriding manual setting control provided by this invention. The reference numeral 1 designates an exposure meter having a shaft 1a to the end of which is secured a lever 2. Secured to the end of the meter shaft lever is rocker actuating shaft 3 for positioning a pair of diaphragm blades 4 and 5 to adjust the aperture provided thereby in response to the degree of illumination measured by the exposure meter 1 in the usual manner.

The manual overriding aperture setting control of the invention includes a manual operating lever 6 pivoted at one end on a shaft 7 within the camera body, and illustrated herein as passing under the actuating shaft 3. The free end of the operating lever is provided with a follower pin 6a which engages a spiral cam groove 10a provided in an aperture setting sleeve 10c. A second lever 8 is also pivoted at one end on the shaft 7 and passes over the operating shaft 3; the free end terminating in an abutment or contact section 8a. The lever 8 is biased counterclockwise by a spring 9 in the direction of the arrow, the abutment section abutting the top of an extending operating rod 11b. Both of the levers 6 and 8 in the "automatic" position illustrated, pass under and over the actuating shaft 3 with enough clearance to permit the unrestricted operation of the actuating shaft by the exposure meter 1.

The aperture setting sleeve 10c is rotatably mounted in the camera body and is integral with a diaphragm adjusting knob 10 provided with aperture setting and "Auto" indicia which are read against a reference or index mark 16 on the camera body. The sleeve 10c is formed with the spiral groove 10a previously mentioned and an L-shaped groove 10b. Slidably received within the sleeve 10c is a depressible pushbutton 11, the operating rod 11b previously mentioned passing through the L-shaped groove 10b and being movable with the pushbutton 11. The lower end of the pushbutton is provided with a reduced diameter 11a, a coil compression spring 12 tending to bias the pushbutton upwardly, the ends of the vertical portion of the L-shaped groove serving as limiting stops for the pushbutton due to the abutment therewith of the operating rod. It should be noted that the bias of spring 12 is greater than the bias of spring 9 so that release of the pushbutton from its depressed position will permit the spring 12 to return the pushbutton to its initial position as illustrated, at the same time causing the lever 8 to be pivoted clockwise by the operating rod 11b against the bias of the spring 9.

Figure 2:
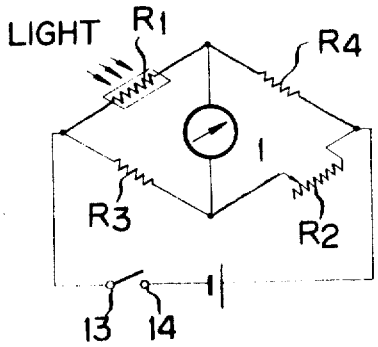
FIG. 2 is an electrical circuit diagram of the said embodiment.

In addition to its coaction with the abutment section 8a of the second lever, the operating rod 11b also coacts with the normally closed contact switch members 13, 14 of the conventional exposure meter circuit illustrated in FIG. 2 wherein the contacts are illustrated as being open during "manual" operation. The operating rod 11b also passes through an appropriate slot 15 in the camera body to prevent rotation of the pushbutton 11.

The exposure meter circuit of FIG. 2 comprises the usual bridge arrangement of a photoelectric element R1, an adjustable resistor R2 which may be adjusted in accordance with film speed, shutter speed, and the like and two fixed resistors R3 and R4 together with the exposure meter 1, a battery supply and the switch members 13 and 14.

When it is desired to set the aperture manually, the pushbutton 11 is depressed in the direction of the arrow to move the operating rod 11b downwardly as shown by the arrow. The lever 8 will thus be rotated counterclockwise by the bias of its spring 9, and the contact members 13 and 14 will be opened to disable the exposure meter circuit. When the operating rod engages the horizontal portion of the L-shaped groove, the diaphragm setting knob 10 may be rotated clockwise in the direction of the arrow to align an appropriate aperture setting indicia on the knob with the index 16, the operating rod being in the horizontal portion of the groove 10b permitting the rotation of the sleeve 10c. As illustrated the groove 10a is an ascending spiral thus causing the rotation of the operating lever 6 clockwise in the direction of the arrow. This scissoring or pinching action of the two levers 6 and 8 will move and hold the actuating rod 3 in the manually positioned aperture setting, either closing down or opening the aperture previously set automatically by the exposure meter 1.

When "automatic" operation is again desired, the counterclockwise rotation of the knob 10 to the automatic setting will align the vertical portion of the L-shaped groove and the operating rod 11b. The spring 12 having the greater spring force will return the pushbutton to its initial position, moving the operating rod 11b upwardly to permit switch members 13 and 14 to close and to lift the second lever 8 to its "open" position against the bias of the spring 9. The rotation of the sleeve in the counterclockwise direaction will rotate the manual operating lever 6 counterclockwise to its "open" position due to the camming action of the spiral groove in the sleeve.

What is claimed is:

1. A diaphragm opening control device for a photographic camera comprising, in combination, means for automatically controlling the aperture of the diaphragm blades; and means for manually controlling the aperture of the diaphragm blades;

said automatic aperture controlling means including a photoelectric cell and a galvanometer connected within an automatic aperture control circuit, a rockable member fixed to and movable with the rotatable member of said galvanometer, the aperture of the diaphragm blades being determined by the angular position of said rockable member corresponding to the output of said cell, said manual aperture controlling means including a manually adjustable member rotatably mounted on the camera body, a lever pivoted in the camera and movable within the movement range of said rockable member *by said manually adjustable meber, and an abutment member pivoted in the the camera and biased so as to follow the movement of said lever, said rockable member being caught between said lever and abutment member for manual adjustment thereof, and a manually operated switching member which is movable from a first position to a second position, when said manually adjustable member is rotated to an extreme position thereof, so as to lock said manually adjustable member and carry said abutment member outside the movement range of said rockable member, whereby, when said manually adjustable member is locked by said manually operated switching member, said lever is held by said manually adjustable member outside the movement range of said rockable member* and said abutment member is held by said manually operated switching member, respectively, outside the movement range, while when said manually adjustable member is unlocked from said manually operated switching member, said rockable member is caught between said lever and said abutment member.

2. A diaphragm opening control device according to claim 1, in which said automatic aperture control circuit further comprises a voltage source and a pair of electric contacts, the electric contacts being opened to deenergize said circuit by the manual switching member while said manual adjusting member is unlocked.

3. A diaphragm opening control device according to claim 1, in which said manual adjusting member has an outwardly projected peripheral region and a cylinder region which has a cam slot, and said manual switching member being a pushbutton slidably fitted within said cylinder and spring urged.

4. A diaphragm opening control device according to claim 3, in which said cylinder region has a L-shape slot, and said pushbutton has a projection slidably engaged in said L-shape slot, whereby the movement of said manually adjusting member is locked when said projection is engaged with the axially extending portion of said L-shape slot, while the movement of said manually adjusting member is unlocked when said projection is engaged with the radially extending portion of said L-shape slot.

5. A diaphragm opening control device according to claim 4, in which said projection slides within said L-shape slot so as to hold or free said abutment member for switching between automatic aperture controlling and manual aperture controlling.

6. A manually operated aperture setting device for a camera having an automatic aperture setting mechanism including an exposure measuring circuit with a normally closed switch and an exposure meter for positioning a rockable member to adjust the diaphragm opening in accordance with the degree of illumination measured by the circuit, the combination comprising two pivotable levers angularly disposed relative to each other to include the rockable member therebetween with clearance to permit unrestricted movement of said member by the exposure meter, biasing means for one of said levers biasing the one lever toward the rockable member, means for holding said one lever in its angularly disposed position, the release of said means permitting the biasing means to pivot the one lever into abutment with the rockable member, and means for pivoting the other of said levers into abutment with the rockable member and position the rockable lever in accordance with a desired aperture setting.

7. Aperture setting device according to claim 6, wherein the means for holding said one lever includes means for opening the normally closed switch in the exposure measuring circuit upon release of said holding means.

8. Aperture setting means according to claim 6, wherein said two levers are pivoted at their respective ends on a common shaft and the means for holding the one lever in its angularly disposed position includes a rotatable aperture setting sleeve formed with an L-shaped groove, a pushbutton slidably received in said sleeve, an operating rod fixed to said pushbutton extends outwardly through said L-shaped groove and toward the free end of said one lever to be abutted thereby, and a second biasing means for biasing said pushbutton to an initial position, the force of said second biasing means being greater than the first mentioned biasing means.

the depression of the pushbutton from its initial position permitting the pivoting of the one lever by the first mentioned biasing means to abut the rockable member, the means for pivoting the other of said levers including a spiral groove on said aperture setting sleeve, and a follower pin in the free end of the other of said levers and engaging said spiral groove, the rotation of said aperture setting sleeve upon depression of said pushbutton pivoting the other of said levers to abut and position said rockable member in a desired aperture setting position.

9. Aperture setting means according to claim 8 wherein said operating rod cooperates with the normally closed switch in the exposure measuring circuit, the depression of said pushbutton causing said operating rod to open said switch.

References Cited

The following references, cited by the Examiner, are of record in the patented file of this patent or the original patent.

UNITED STATES PATENTS

| | | | |
|---|---|---|---|
| 3,139,804 | 7/1964 | Jakob et al. | 95—64 R X |
| 3,173,350 | 3/1965 | Steisslinger | 95—64 D |
| 3,234,867 | 2/1966 | Sho et al. | 95—10 C X |
| 3,301,153 | 1/1967 | Ataka | 95—10 C |

FOREIGN PATENTS

| | | | |
|---|---|---|---|
| 1,306,780 | 9/1962 | France | 95—64 D |
| 875,556 | | Great Britain. | |
| 954,864 | | Great Britain. | |
| 1,014,496 | | Great Britain. | |
| 1,016,637 | | Great Britain. | |
| 1,055,806 | 1/1967 | Great Britain. | |

JOSEPH F. PETERS, Jr., Primary Examiner

U.S. Cl. X.R.

95—64 D